No. 850,651. PATENTED APR. 16, 1907.
C. JOHANNSEN.
ANVIL FOR RIVETING MACHINES.
APPLICATION FILED OCT. 13, 1905.

Inventor:
Christian Johannsen
by G. Dittmar
Attorney

UNITED STATES PATENT OFFICE.

CHRISTIAN JOHANNSEN, OF OEVERSEE, NEAR FLENSBURG, GERMANY.

ANVIL FOR RIVETING-MACHINES.

No. 850,651.     Specification of Letters Patent.     Patented April 16, 1907.

Application filed October 13, 1905. Serial No. 282,626.

*To all whom it may concern:*

Be it known that I, CHRISTIAN JOHANNSEN, a subject of the Emperor of Germany, residing at Oeversee, near Flensburg, Germany, have invented certain new and useful Improvements for Anvils for Riveting-Machines, of which the following is a full, clear, and exact specification.

The anvils of riveting-machines are generally solid, so that the whole instrument sustains the blow of the riveting-hammer. The anvil recedes at each blow naturally, and the operator using the anvil has to take great care to replace his instrument.

The present invention has for its object an anvil with an inner elastic part, so that the operator does not feel anything of the blow of the riveting-hammer, as the instrument in his hands does not yield and only the inner part sustains the blow.

Figure 1:
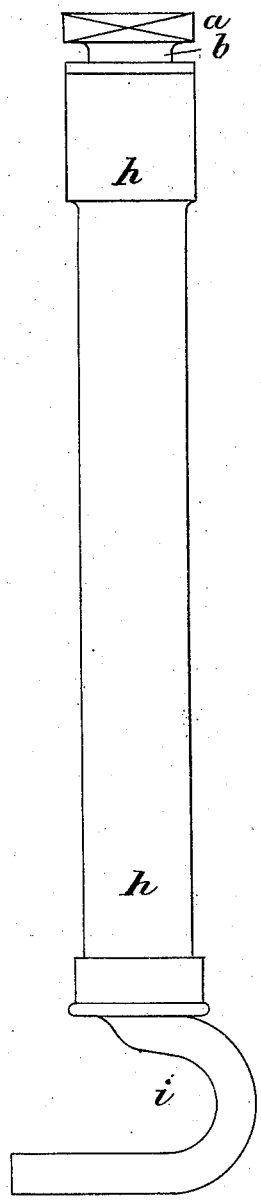
Figure 2:
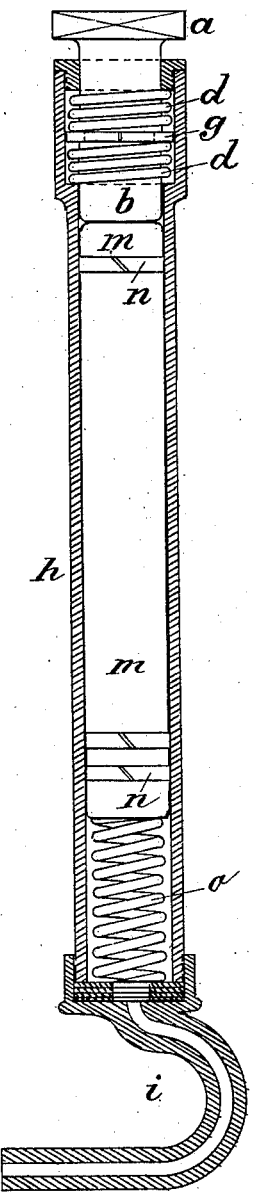

In the accompanying drawings, forming part of this specification, Figure 1 shows the anvil in side elevation, and Fig. 2 is a longitudinal section.

The instrument is in the shape of a cylinder with a piston $a$ forming the anvil. The head may be square or of any shape, while the shank is preferably cylindrical. This shank $b$ is guided in the end of a cylindrical sleeve $h$ and is provided with a collar $g$, both sides of which are acted upon by springs $d$, located in an enlargement of the sleeve $h$, as shown in Fig. 2. In the rear of this shank $b$ thus elastically supported between springs, a piston $m$ is located, having a plurality of rings $n$, of the kind ordinarily used for steam-pistons. The front end of said piston $m$ is in contact with the end of shank $b$, while the other end of said piston is supported by a strong spring $o$, as shown in Fig. 2. Said spring $o$ may be dispensed with, and air under high pressure may be introduced into the cylinder to act in a similar manner as the spring $o$. To this end the handle $i$ of the instrument is hollow and is connected with a conduit for compressed air.

In riveting, the blow of the hammer transferred through the rivet itself is taken up by the head $a$ and is further transferred by the piston $m$ upon the spring $o$ or upon the air-cushion, if compressed air is used in place of said spring. Thus the instrument remains in its position and only the head $a$, with its shank and the piston $m$, are pushed backward and are conveyed back into the original position by the elastic spring or by air-pressure.

It is deemed important that the shank of the head and the piston be separate from each other, so that in riveting the blow is communicated from the head to the piston behind the same of considerable greater weight and is received by the same, the piston then making the backward movement, the head in the meantime, as well as the sleeve, receiving practically no shock, the springs $d\,d$ acting independently.

Having thus described my invention, what I claim is—

1. In an anvil for riveting-machines, the combination with a cylinder, of a head having a shank movable in said cylinder, a piston in said cylinder to the rear of and engaging said shank, yielding means behind said piston, and yielding means acting on said shank.

2. The herein-described anvil for riveting-machines, the same comprising a cylinder with enlargement at the end, a head having a shank extending into said cylinder, a collar on said shank within said enlargement, springs upon opposite sides of said collar, a piston in said cylinder against the end of which the inner end of said shank directly bears, and resilient means at the other end of said piston.

In testimony whereof I affix my signature.

CHRISTIAN JOHANNSEN.

In presence of—
   G. HERMES,
   JULIUS RÖPKE.